(12) United States Patent
Chapman

(10) Patent No.: US 6,902,108 B1
(45) Date of Patent: *Jun. 7, 2005

(54) METHOD AND APPARATUS FOR PROVIDING IDENTIFICATION

(76) Inventor: Bryan P. Chapman, P.O. Box 433, Clayfield (AU), QLD 4011

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/793,415
(22) PCT Filed: Aug. 25, 1995
(86) PCT No.: PCT/AU95/00545
§ 371 (c)(1), (2), (4) Date: May 1, 1997
(87) PCT Pub. No.: WO96/06409
PCT Pub. Date: Feb. 29, 1996

(30) Foreign Application Priority Data

Aug. 25, 1994 (AU) .............................................. PM7690
Aug. 9, 1995 (AU) .............................................. PN4702

(51) Int. Cl.[7] .......................................... G07B 15/02
(52) U.S. Cl. ..................... 235/384; 235/380; 340/5.52; 340/5.82
(58) Field of Search .............................. 235/382, 384, 235/385, 492, 380; 340/825.54, 5.1, 5.61, 5.8, 5.81, 5.82, 10.1, 10.2, 10.4, 10.42, 5.2, 5.52, 10.41; 382/115

(56) References Cited

U.S. PATENT DOCUMENTS

| | | | | |
|---|---|---|---|---|
| 4,377,870 A | * | 3/1983 | Anderson et al. | 455/2 |
| 4,556,883 A | * | 12/1985 | Strietzel | 340/10.4 |
| 4,688,244 A | * | 8/1987 | Hannon et al. | 379/58 |
| 4,691,202 A | * | 9/1987 | Denne et al. | 340/825.54 |
| 4,805,223 A | * | 2/1989 | Denyer | 382/127 |
| 4,937,581 A | * | 6/1990 | Baldwin et al. | 342/44 |
| 4,985,920 A | * | 1/1991 | Seki | 235/380 |
| 5,038,283 A | * | 8/1991 | Caveney | 364/403 |
| 5,131,038 A | * | 7/1992 | Puhl et al. | 340/5.61 |
| 5,202,929 A | * | 4/1993 | Lemelson | 382/116 |
| 5,227,613 A | * | 7/1993 | Takagi et al. | 235/380 |
| 5,298,884 A | * | 3/1994 | Gilmore et al. | 340/573.4 |
| 5,317,309 A | * | 5/1994 | Vercellotti et al. | 235/380 X |
| 5,386,104 A | * | 1/1995 | Sime | 235/382 X |
| 5,396,227 A | * | 3/1995 | Carroll et al. | 340/825.36 |
| 5,401,944 A | * | 3/1995 | Bravman et al. | 235/375 |
| 5,406,263 A | * | 4/1995 | Tuttle | 340/572.1 |
| 5,477,215 A | * | 12/1995 | Mandelbaum | 235/380 X |
| 5,478,991 A | * | 12/1995 | Watanabe et al. | 235/375 |
| 5,537,105 A | * | 7/1996 | Marsh et al. | 340/825.54 |
| 5,541,585 A | * | 7/1996 | Duhame et al. | 235/382 X |
| 5,687,175 A | * | 11/1997 | Rochester et al. | 370/449 |
| 5,995,017 A | * | 11/1999 | Marsh et al. | 340/10.2 |
| 6,045,652 A | * | 4/2000 | Tuttle et al. | 340/10.1 X |

FOREIGN PATENT DOCUMENTS

EP 990 756 A2 * 7/1999
GB 2 203 313 A * 10/1988

OTHER PUBLICATIONS

Benjamin Miller "Vital signs of identity" IEEE SPECTRUM p. 22–30, Feb. 1994.*

* cited by examiner

*Primary Examiner*—Jared J. Fureman
(74) *Attorney, Agent, or Firm*—Marvin H. Kleinberg; Marshall A. Lerner; Kleinberg & Lerner, LLP

(57) ABSTRACT

A method of providing identification of an individual including:

maintaining a database of identification data specific to the appearance and/or condition of individuals;
providing a unique description for each individual enabling access to the individual's identification data in the database, and
providing identification means (10) adapted for portage with the individual and containing the unique description.

9 Claims, 7 Drawing Sheets

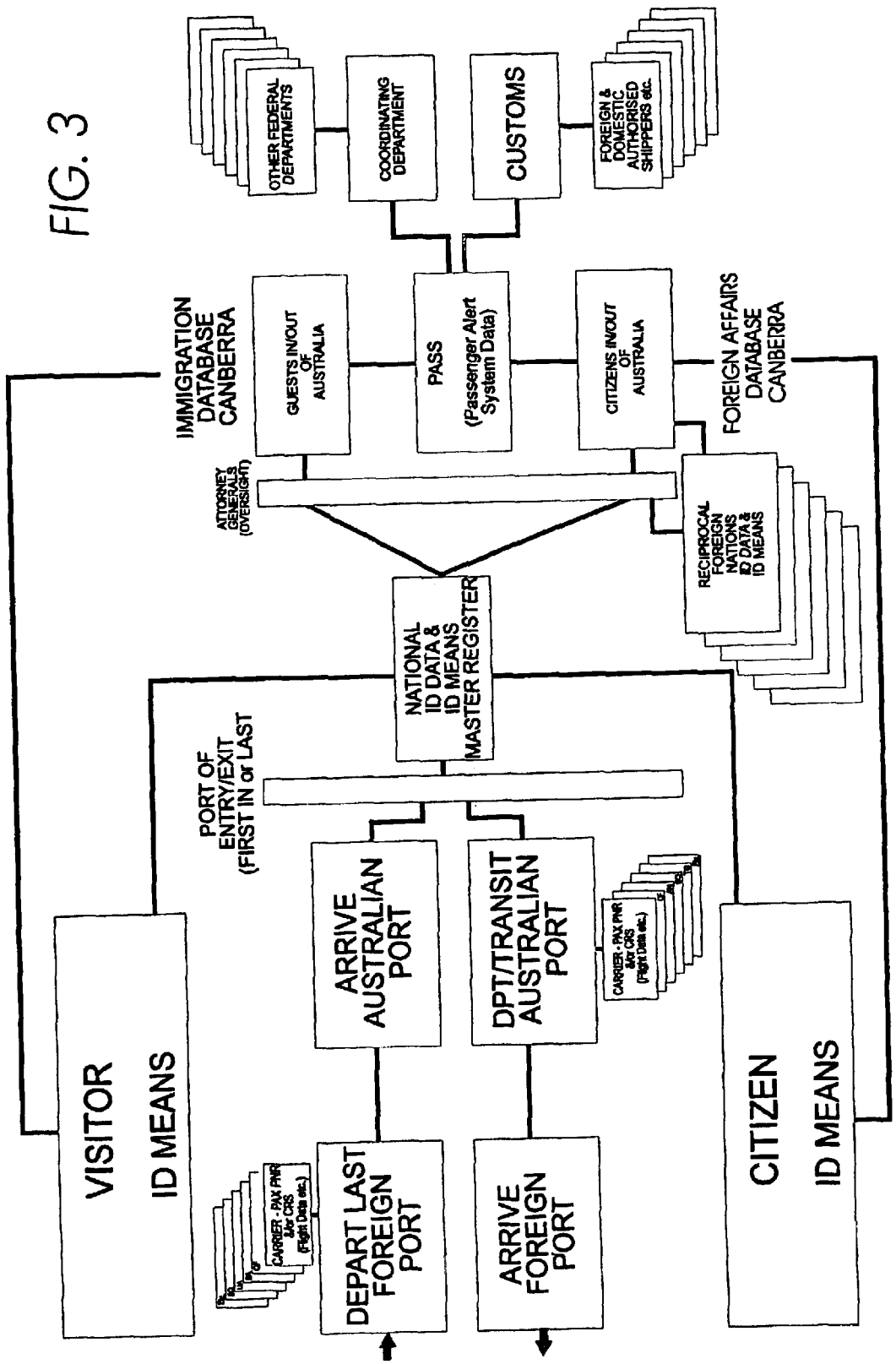

METHOD AND APPARATUS FOR PROVIDING IDENTIFICATION

BACKGROUND OF THE INVENTION

This invention relates to a method of and apparatus for providing identification. This invention has particular but not exclusive application to a method of and apparatus for identifying persons and unique articles which retain a lifelong distinctive identity such as paintings and other objects of art. Such persons and articles are hereinafter collectively referred to as "an individual or individuals". In other aspects the invention may be used for identifying freightable articles such as shipping containers, motor vehicles or the like.

Positive identification of individuals is important for preventing unauthorized access to or passage from selected locations or facilities such as banks, accounts, etc. and restricted areas such as secure buildings and airport terminals and the like. Positive identification of individuals is particularly important for making Government level decisions concerning travelers access to countries, especially international travelers.

International travelers are often subjected to disruptive and excessive delays upon arrival at and/or departure from airport terminals as officials attempt to establish the bona fides of each traveler by manually interrogating each traveler and comparing the person being interrogated with the available identification such as passports, memory lists and computer files and the like, with the aim of identifying any traveler who is unauthorized to enter the country or whose details are on lists of restricted individuals. This entry check is also utilized to record details of movement of travelling individuals to and from each country visited.

The presently available methods of positive identification of an individual typically include passports, knowledge of restricted information, such as a password, possession of a restricted article, such as a pass key, or physical appearance of the individual as portrayed in a reference photo.

Security based upon knowledge of restricted information or possession of a restricted article may be compromised without discovery since the information may be obtained from its rightful owner. Consequently such information does not provide a satisfactory method for positive identification of an individual in all cases, particularly where such identification has to be made quickly.

Methodologies relying on physical appearance, commonly referred to as biometric techniques such as fingerprint analysis, thermograms and DNA analysis are considered less vulnerable to mistaken identity and therefore am attractive to authorities but to date have been difficult to utilize successfully. Mostly such methodologies require a vast databank containing the particular biometric data which may be difficult and/or slow to locate and access.

One known method of utilizing biometric techniques for identification of an individual for the purpose of restricting entry to an area to authorized persons only, includes providing each of the authorized individuals with a card containing biometric data specific to each individual. The card can be proffered at a reading station wherein the biometric data is read by a card reader or the like and compared with the individual proffering the card. A high correlation between the card data and the contemporaneously acquired data of the individual proffering the card results in access and a low correlation causes a refusal. This system however does not prevent unauthorized cards being produced which may be used for gaining unauthorized access to a facility.

Another known method includes comparing the biometric data on a card proffered by an individual to a previously created database of biometric data of authorized individuals. Such a system can be foiled by individuals who have obtained a card from its rightful owner.

SUMMARY OF THE INVENTION

The present invention aims to alleviate at least one of the above disadvantages and to provide a method of and apparatus for providing identification which will be reliable and efficient in use.

With the foregoing in view this invention in one aspect resides broadly in a method of providing identification of an individual or a freightable article including:

maintaining a database of identification data specific to the appearance and/or condition of the individuals or freightable articles;

providing a unique description for each individual or freightable article enabling access to the individuals' or freightable articles' identification data in the database; and providing identification means adapted for portage with the individual or article and containing the unique description.

The identification data contained in the database may be data representative of an identifiable attribute and preferably includes biometric information such as thermograms, fingerprints, photographs, voice prints, DNA sequences or the like. Preferably the biometric information is information which may be obtained noninvasively and suitable information which can be obtained or captured by imaging an individual or article from a remote location. If the individual or article is not a living organism then other identifiable attributes such as surface images or acoustic response patterns may be utilized and the data representative of these attributes may be updated from time to time to take account of deterioration or changes in the article.

Preferably the database contains one protected parcel of identification data in respect of each individual or freightable article. The protected parcel of identification data may be representative of more than one identifiable attribute such as thermogram and fingerprint. Each parcel may be associated with one or more add-on only files which may record historical or other information, for example, medical details such as blood group in the case of an individual or proprietorship, manufacturer etc. in the case of a freightable article.

The database may be arranged to check existing data prior to approving entry of an identifiable attribute pertaining to an individual or freightable article so as to ensure that data specific to each individual or article is linked to one unique description only and/or may be arranged to continuously scan the data checking for any matches or defined similarities which may indicate the existence of more than one description for an individual or article, that is, a forgery.

The unique description may be any information or data such as an address in a database and sufficient to isolate a file in respect of an individual or article in a database and may include an individuals name, date of birth, nationality or like characteristics. Preferably however the unique description is a unique file code assigned to the individual or article. The unique description may be arranged according to an international standard so as to enable positive identification of individuals or articles such as shipping containers on a global basis.

Preferably the unique description is machine readable only and of a type which may be protected by protection means. The protection means may be an encoding or encryption of the unique description or it may be or include a secure access code or style.

Preferably the identification means is an identification device as described hereinafter. However, the identification means may be any other suitable means such as for example, a number or code to be memorized by each individual and proffered to obtain access to the identification data in the database.

In another aspect this invention resides broadly in an identification device including:
carrier means, and a unique description carried by the carrier means.

The carrier means may be a card, token, plaque or the like and the unique description may be included thereon in any readable form. Preferably the unique description is machine readable from a remote location. For example, the unique description may be readable by a remote imaging system or laser or infra red radiation scanner or the like. Preferably, the identification device is responsive to a radio frequency signal wherein the unique description is transmitted for receipt by a remote receiving station.

The carrier means may carry information other than the unique description. For example, it may carry information as to which one of several databases contains the identification data for the particular individual or article under scrutiny thereby allowing a reading station to quickly locate the relevant database. Such additional information may also be transmitted with the unique description. Preferably however, the carrier means suitably carries no information of value to any individual other than the individual in respect of whom it was issued or the article in respect of which it was issued. Only the means enabling access to be gained to the identification data in respect of that individual or article. Similarly, transfer of an identification device issued in respect of a particular article to another article serves no useful purpose.

The identification device may also include distinguishing means by which a receiving station can distinguish the identification device from other commonly carried programmable cards and like devices. In a preferred form of the invention the distinguishing means includes a built-in time delay wherein other devices transmit their signals prior to transmission by the identification device thereby enabling a receiver to distinguish those signals from the signals transmitted by the programmable cards and the like from those transmitted by the identification device and accordingly discard them.

The identification device may include access means adapted to provide access to the receiving station such that the receiving station prepares itself to receive the unique description only after being opened by the access means. For example, the access means may include a specific signal stream recognized by the receiving station. The identification device may further include validation means for checking the validity of the information contained in previous signals. Preferably the validation means is arranged such that any tampering with the unique description or other information contained in the identification device or any tampering with components of the identification device will result in the identification device being flagged for investigation and at the same time allow receipt of any available information by the receiving station for storage at the receiving station in the add-on only file.

The identification device may also include encryption means wherein information transmitted from the identification device to a receiving station may be understood only by a receiving station utilizing corresponding decoding means.

In a preferred form of the invention wherein the carrier means is a card, identification data specific to each card issued is maintained in a database which may be suitably linked associated with a database containing identification data specific to the individual to whom the card was issued.

Such card specific data may for example include a pattern or ornamentation applied to a face of the card and readable by image reading equipment. Alternatively, the card specific data may be an individual signal contained in a transponder and readable from a remote location.

In another aspect this invention resides broadly in a method of facilitating travel of an identifiable group of individuals presently identified or to be identified as previously described, including:
  accessing the database or databases at or after an indication by an individual of the group of an intent to travel, accessing being enabled using the identification means;
  compiling a packet of identification data in respect of the identified group of individuals;
  retrieving the packet or data to a localized monitoring area at which said identified group are assembled or confirm their intention to travel;
  comparing data of each individual in the retrieved packet of information with corresponding data generated at the localized monitoring area, and
  permitting individuals with an operative correlation of data to continue on their travels.

This method provides the advantage that relatively large databases may be interrogated quickly either before travel or during confinement of the group for a prolonged travel period, to assemble a relatively small packet of data which may be readily localized to permit almost instantaneous positive identification of individuals in the group to be achieved and thereby facilitate their movement across restricted borders.

The database may be an international database. Preferably however, each country maintains a national database containing information in respect of citizens of that country. Each national database may also include information in respect of foreign citizens who have previously entered each respective country, thereby providing easy access to data in respect of those persons who frequently travel to and from a particular country. This may be contained in the add-on only file. The database or databases may be accessed upon instructions from the departure station or the destination station. The national databases may also include a restricted individuals database, containing identification data in respect of individuals who are restricted from entering or leaving the country by court order or who are known criminals or the like. All members of the group may be quickly compared against such a database.

The packet of identification data may include parcels of identification data in respect of each member of the identified group of individuals and may relate to any group of individuals. A group may include all passengers ticketed for a particular vehicular movement such as a flight, train or bus journey, voyage or the like. In a preferred form, the identification data includes the identification data specific to each individual, such as the individual's thermogram, with travel information such as travelling companions and seat allocation being provided in the add-on only files. This may provide information and an audit trail which officials may use to readily identify useful information concerning an individual. This is particularly advantageous if one individual is identified as being unauthorized.

The packet of identification data compiled may include data taken from each individual's identification means and other information provided by the individual. However, in a preferred form of the invention, the identification data includes date specific to each individual which is retrieved from the database.

Preferably, the packet of data is compiled at the departure station, although it may be compiled at the national database or another suitable compiling station and be transmitted to a monitoring station for storage in a temporary storage means.

Preferably, the packet of data is transmitted in an encrypted form so as to prevent interference from unauthorized persons.

The localized monitoring area may be a monitoring station located at a departure airport or a destination airport or any other suitable station and the packet of data may be retrieved at one or more monitoring stations. In a preferred form of the invention the packet of data is compiled at the departure airport where it is temporarily stored and retrieved for comparison with departing passengers and also transmitted to the destination airport for comparison with the passengers as they arrive.

Preferably the identification means carried by each individual includes a unique description which is readable from a remote location as previously described. Such identification means provide an individual with the necessary means enabling passive confirmation of the individual's identity by being monitored remotely and compared with the identification data in the database. Alternatively, individuals may be required to present their respective identification means to a reader at a transit or monitoring station for monitoring purposes.

Whilst the individual could be compared visually by an operator with identification data in the form of an image retrieved automatically from the database upon reading the identification means at the monitoring station, it is preferred that the comparison be a non-subjective comparison performed mathematically or electronically such that human error or purposeful wrongdoing is avoided.

In a preferred form of the invention the identification data is a thermogram which may be compared with the corresponding passenger by any suitable means such as those disclosed in U.S. Pat. No. 5,163,094 to Prokowski.

In another aspect this invention resides broadly in a method of facilitating movement of freightable articles such as shipping containers including:

sealing said article with an identifiable sealing means which must be damaged in order to obtain access to said article;

entering information in relation to said sealing means and/or said article into said database;

checking said sealing means at a monitoring station to determine whether the article has been accessed;

retrieving the data to two localized monitoring areas at which said article is stored;

comparing retrieved data in respect of the article with corresponding data generated at the localized monitoring area, and permitting articles with an operative correlation of data to proceed to destination without inspection.

Preferably, the freightable article is identified according to the method of providing identification previously described. It is also preferred that the database is accessed at a time on or after allocation of the article to an identifiable shipping movement to enable positive identification of the article.

Preferably, the identifiable sealing means is an identification device as previously described and which has been suitably formed for attachment to an article in such manner that the device must be broken in order to gain access to the contents of the article. It is also preferred that the identifiable sealing means has a unique seal description included thereon in a readable form. For example, the unique seal description may be an array of numerical characters which is sufficient to isolate a file in respect of an individual seal and/or an individual article. The identifiable sealing means may also include unique seal specific data such as a pattern or ornamentation applied to a face of the sealing means and readable by image reading equipment.

Alternatively, the seal specific data may be an individual signal contained in a transponder and readable from a remote location.

Suitably, the sealing means contains no information of value to any individual, only the means enabling access to be gained to the information relating to the sealing means and the article to which it is applied in the database. In a preferred form of the invention such access will only be mailable to those authorized persons identified according to the previously described method of providing identification and will only be achieved after satisfactory correlation of that authorized person's biometric data collected at the place of access and the biometric data stored in the corresponding database.

Preferably, information in relation to the identifiable sealing means is added to the information contained in the database in respect of the article to which the sealing means is applied. It is also preferred that such information includes the unique seal description and that it is entered as an add-on file. Such add-on file may be superseded by later add-on files, although it is preferred that all current and noncurrent add-on files are maintained in the database for audit purposes. However, the sealing means may be utilized with a non-identified article and, in such case, information in respect of the sealing means may be added to a database in respect of the shipping agent or some other suitable database.

An add-on file may include information in respect of an article and a particular shipping movement. For example, in the case of the article being a shipping container, the information may include details on the personnel who packed the container, the time and date packed, the departure station, the arrival station etc, and the contents of the container. Such information may be added directly by authorized personnel.

Furthermore, the database may include information in respect of the identifiable sealing means such as its time and place of issue, individual or firm to whom it was issued, shipping agent code or other similar information important for audit purposes. Preferably such information is also entered by authorized personnel only.

Checking for correlation with the information in the database may include visual checking of the sealing means and or article but preferably checking is carried out from a remote monitoring area.

The localized monitoring area may be a monitoring station located at packing, manufacturing or dispatch area, departure port or destination port or any other suitable station and the packet of data may be retrieved at one or more monitoring stations.

In one form of the invention wherein a group of many shipping containers or other freightable articles is transported by a single transport vehicle such as a ship or train, a packet of data comprising information in respect of each container in the group may be compiled at the departure port or other suitable compiling station by accessing the database in respect of each container. Such packet of data may be temporarily stored and retrieved for comparison with departing containers and also transmitted to the destination port for comparison with the containers as they arrive. Preferably, the packet of data is transmitted in an encrypted form so as to prevent interference from unauthorized persons.

Advantageously, relatively large databases may be interrogated before or during shipment to assemble a relatively small packet of data which may be readily localized to permit almost instantaneous positive identification of articles in the group to be achieved and thereby facilitate their movement across restricted borders.

The database may be an international database but preferably each country maintains a national database containing information in respect of major articles such as shipping containers or vehicles registered in that country.

In order that this invention may be more readily understood and put into practical effect reference will now be made to the accompanying drawings which illustrate a preferred embodiment of the invention and wherein:

BRIEF DESCRIPTION OF THE DRAWINGS

FIGS. 3 and 4 are diagrammatic representations of the interconnection of relevant functional areas and databases for the implementation of a system according to the invention.

DETAILED DESCRIPTION

Figure 1A:
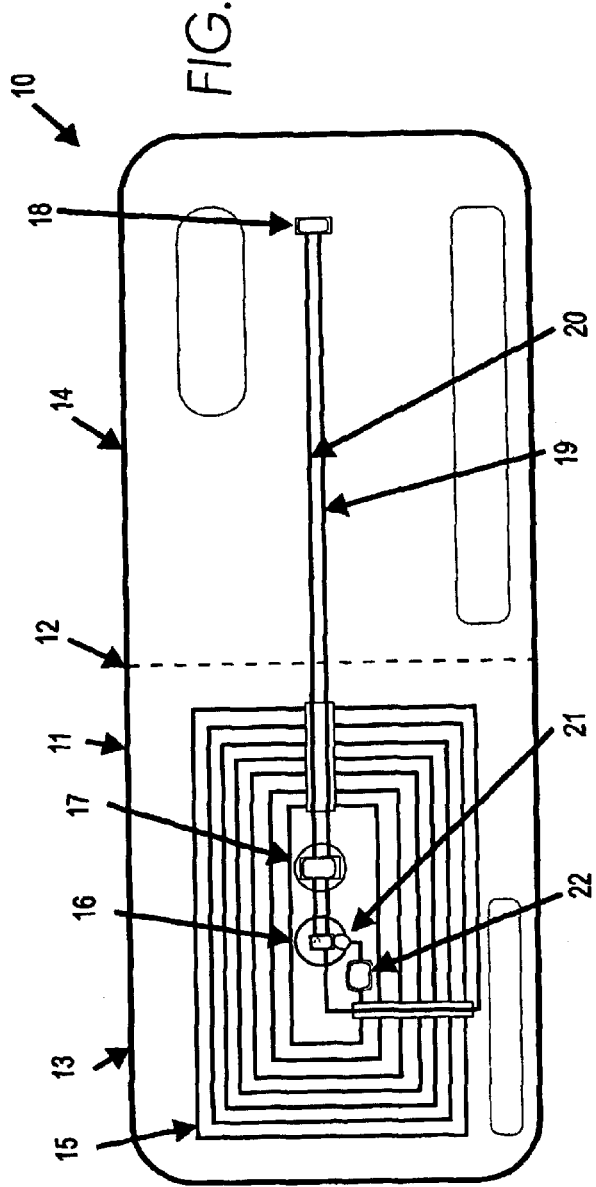
FIG. 1a is a pictorial representation of an identification card according to the invention.

The radio frequency responsive identification card 10 illustrated in FIG. 1a includes a wallet sized flexible plastic base layer 11 foldable about a centrally located fold line 12 which divides the card into an information portion 13 and a validation portion 14. The information portion 13 includes a circuitous antenna 15 embedded in the base layer 11 for receiving signals. The antenna 15 is operatively connected to an entry transponder 16, a description transponder 17 and a validation transponder 18. The validation transponder 18 is located on the validation portion 14, the connection thereto passing across the fold line 12 by conductive tracks 19 and 20. A time delay component 22 is arranged to create a time delay between receipt of a radio frequency signal and transmission of a responding signal.

The transponders 16, 17 and 18 are arranged to report in sequence in response to a radio frequency signal transmitted from an adjacent transmitting and receiving station.

The entry transponder 16 includes an entry key component 21 which is configured to transmit a reader station access code to the receiving station, thereby alerting the receiving station of a valid signal part. The receiving station is thereby prepared for receiving further signal parts from transponders 16, 17 and 18. The component 21 effectively prevents the receiving station processing any signal which does not begin with the access code. The transponder 16 also contains information in respect of which database contains the individual's identification file.

The description transponder 17 is an integrated circuit which transmits a signal indicative of the unique description assigned to the individual to whom the card was issued and an identification of the issuing station which issued the card. The description transponder 17 transmits its signal directly after transponder 16.

The transponder 18 is an integrated circuit containing a validation and encryption code. The encryption code is unique to the card and cooperates with the file location code such that the signal recorded by the receiving station is a parcel of information with a unique identifier which must be decoded by corresponding decoding means associated with the receiving station.

Figure 1B:
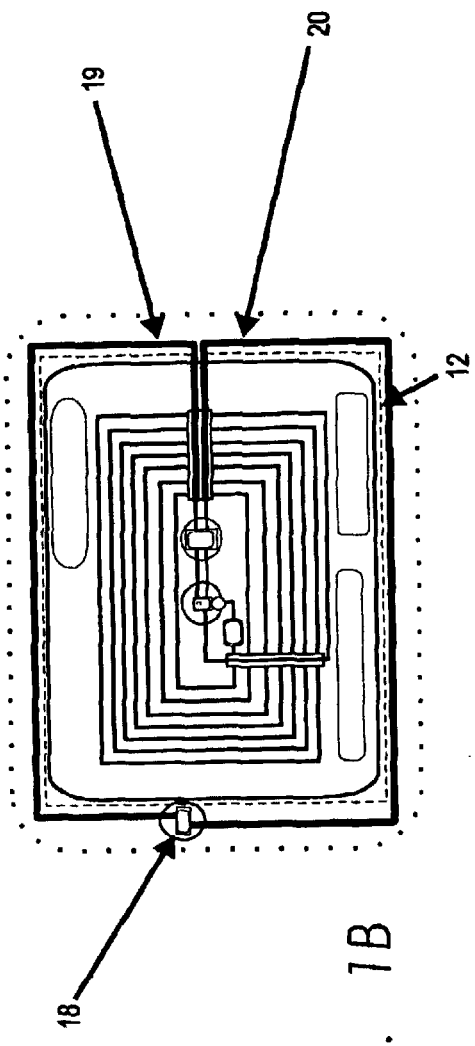
FIG. 1b is a pictorial representation of another identification card according to the invention.

The radio frequency responsive identification card 10 illustrated in FIG. 1b includes components as described in respect of FIG. 1a. However, in this embodiment the validation portion circumscribes the information portion wherein the conductive tracks 19 and 20 effectively surround the antenna 15.

In use, the transmitting and receiving station typically located at both the departure station and the arrival station, transmits an empowering signal at a particular frequency for a predetermined period of time. All cards operating at that frequency and within the designated range or zone, such as by being carried by a single individual, may be activated by the empowering signal. The identification card is activated by the signal but, unlike the other cards, does not respond immediately because of the built-in response time delay. The length of the time delay is set to allow sufficient time for all cards likely to be activated at the same frequency to transmit their messages so as to allow a signal subsequently transmitted by the identification card to be identified and received clearly and uninterruptedly by the receiving station.

At the end of the designated time delay the entry transponder 16 transmits its signal to the receiving station which then prepares to receive a message signal from the description transponder 17 and a validation signal from the validation transponder 18.

If the validation signal is received as expected, the encryption code encompassed in the signal transmitted by validation responder 18, cooperates with the messages from transponders 16 and 17 to create an encrypted message which is received as a parcel of ready to send information by the receiving station. If validation transponder 18 does not respond or indicates a discrepancy in the signal from the description transponder 17, then the message transmitted by transponder 17 is unable to be encrypted by the unique encryption code carried by the responder 18. However, the message is subsequently encrypted by an encryption code specific to the particular receiving station reading the card. Accordingly, the message is prepared as a flagged parcel of information providing an indication that the individual requires further investigation.

Figure 1C:
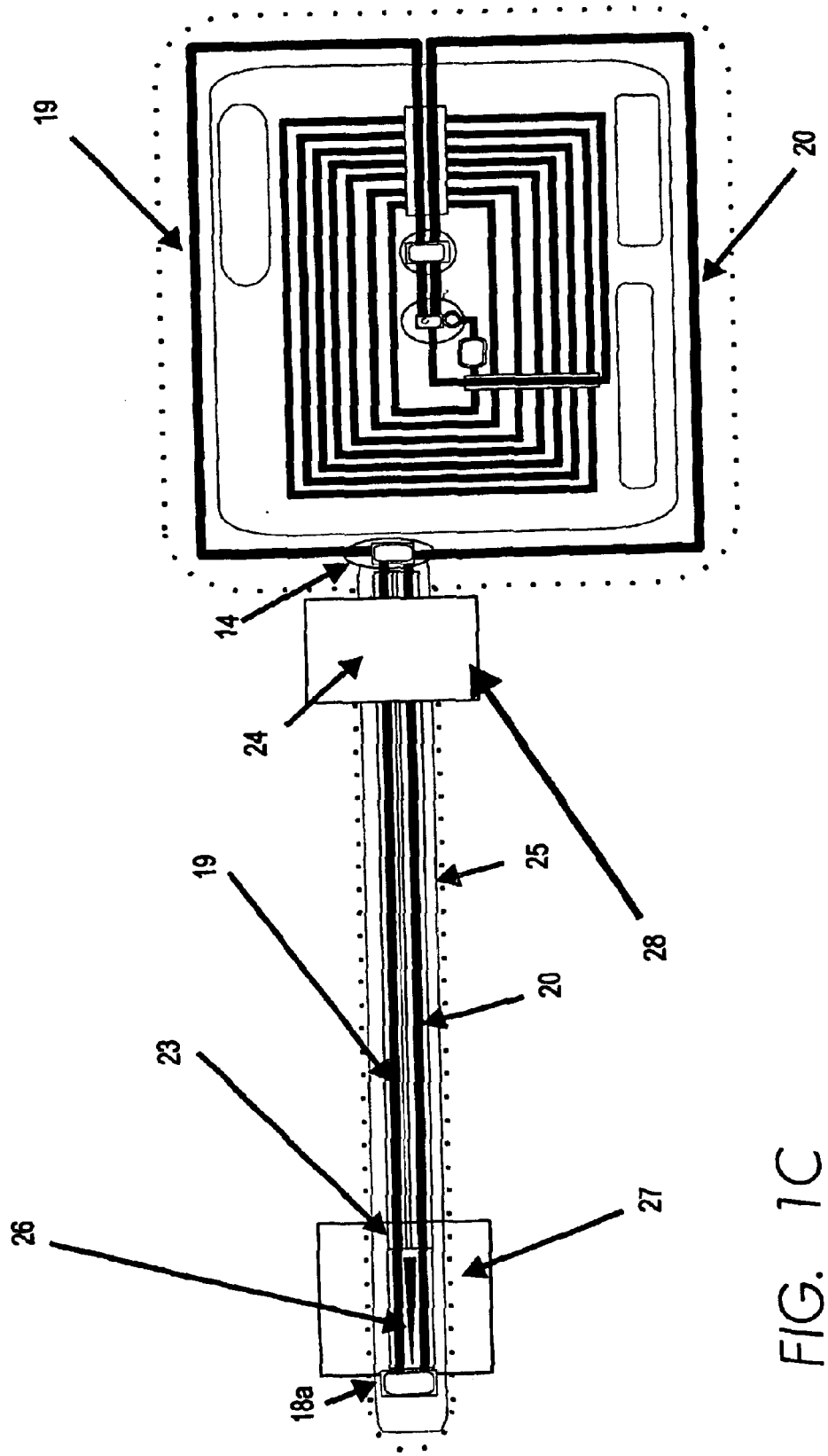
FIG. 1c is a pictorial representation of a container seal according to the invention.
Figure 5:
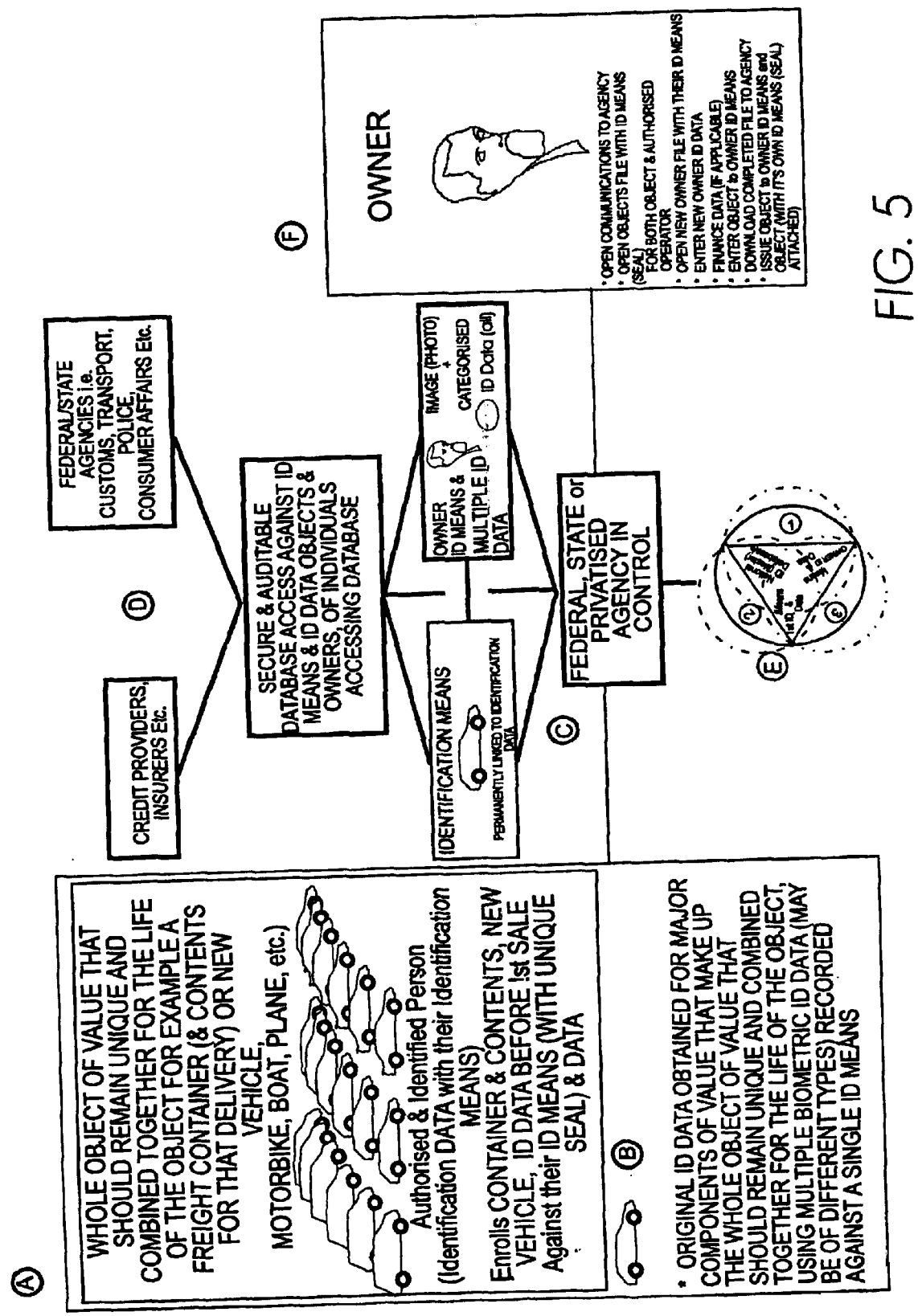
FIG. 5 is a diagrammatic representation of a method of facilitating movement of motor vehicles according to the invention.

FIG. 1(c) illustrates a seal for a shipping container incorporating the card of FIG. 1(b) in pursuance of the method illustrated in FIG. 5. A failure of the validation responder or a discrepancy in the signal from the description transponder 17 indicates that the seal assembly has been removed or broken and that the container has possibly been accessed. It will be appreciated that the seal is a "use only once seal". For this purpose the seal includes a looping strip 27 for looping to the container door and which is received in the knife edge slot 26. A similar looping strip 28 is provided for looping to the container body. Any attempts to open the door will damage the conductive tracks 19 and 20 or the validation transponder 18a. in an alternative embodiment the looping strip 28 is replaced with a saddle including a slot similar to slot 26 and the connector strip 25 may pass through the slot 26 to lock about the container door and the container body.

Figure 2A:
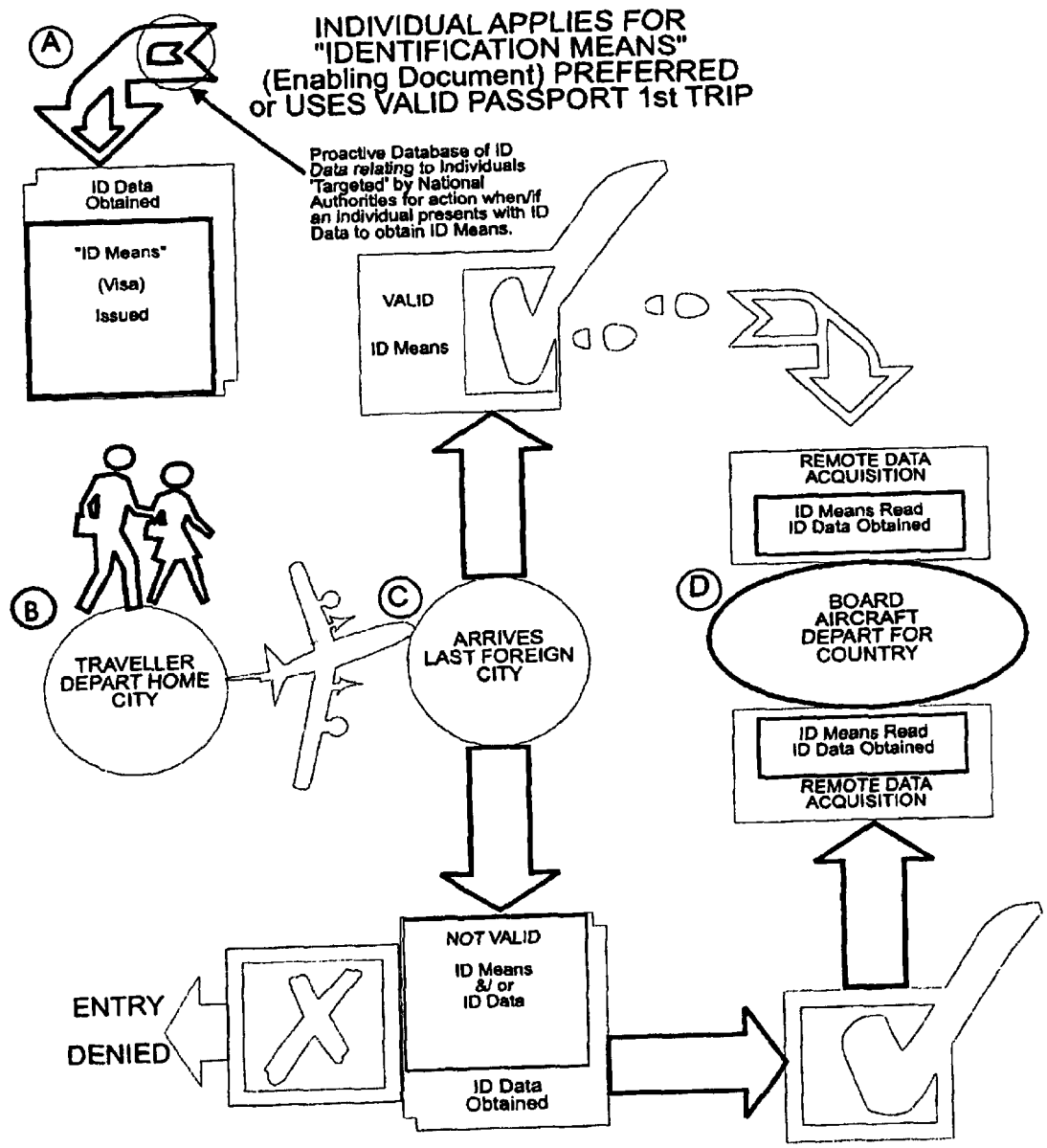
FIG. 2 is a diagrammatic representation of a method of facilitating travel of authorized persons according to the invention.
Figure 2B:
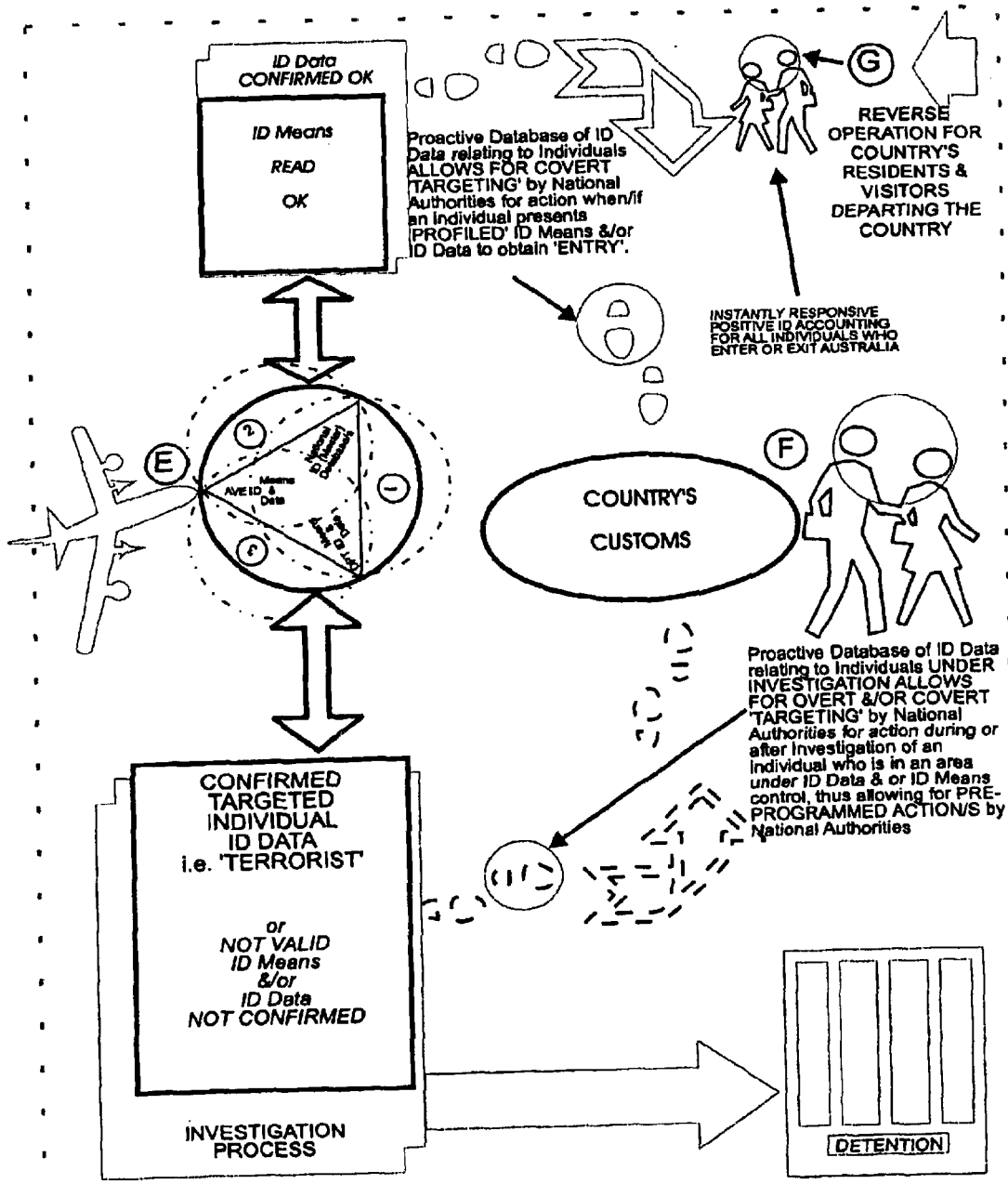
Figure 4:
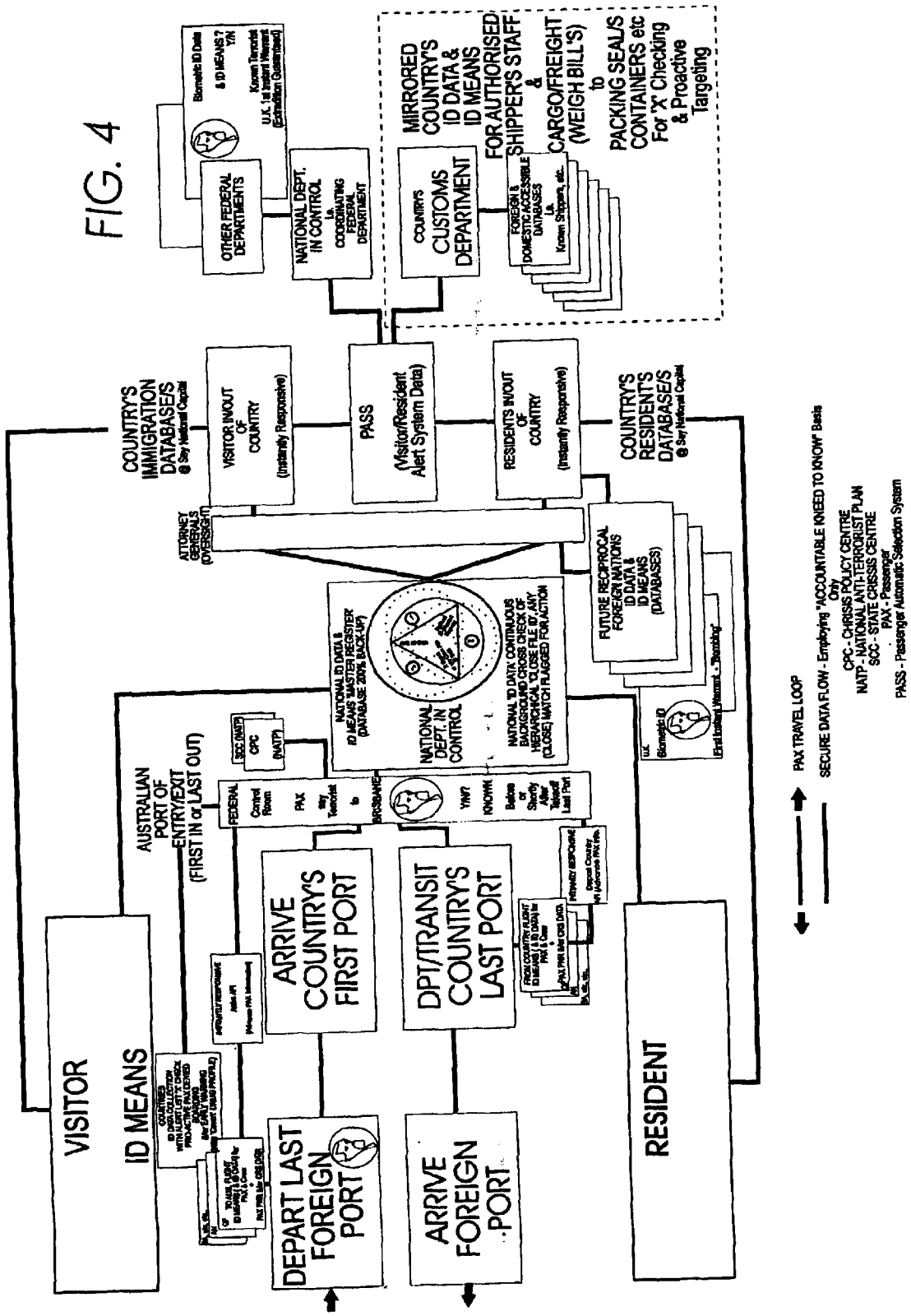

The facilitation of travel by authorized persons is illustrated schematically in FIGS. 2, 3 and 4 and is described hereinafter. Persons wishing to travel internationally apply for and are issued an identification card of the type described above. The card is issued by a card issuing station whereat the appropriate unique description is programmed into the card. Either at the same time or subsequently, the biometric data of choice unique to each person and suitably a thermogram is prepared and stored (preferably in digital form) in the database of the file holding station at a file location designated by the unique description. The thermogram is suitably of the type described in U.S. Pat. No. 5,163,094 to Prokowski.

The individual may subsequently indicate a desire to travel to Australia. Such a desire for example, may be indicated by the purchase of an airline ticket or making an application for a visa. The individual's identification card may be read at this time and the airline ticket would be issued in the name of the person to Whom the card was issued.

At this time the individual's add-on file in the national database would be updated to show that he is authorized to travel to Australia and remain there for a specified period of time. Upon updating of his add-on file the individual may be issued with a suitable receipt or ticket for his own benefit and record although such a receipt would not be used for any official purpose.

In a preferred embodiment the individual's thermogram or other biometric data is retrieved from the database or prepared at this time and stored in a departure station database arranged to collate thermograms in respect of individuals ticketed for each particular flight. Accordingly, information specific to each person as well as information in regard to authorized length of visit and the like or other information enabling quick and easy access to that information in respect of each person on a particular flight is prepared as a packet of identification data prior to the time of departure.

As passengers move towards the departure lounge or through the departure gates, for example, they are scanned by a remote scanner to create a contemporary thermogram which may be instantly compared with the thermogram previously loaded into the departure station database to positively identify each passenger.

Those passengers positively identified as authorized passengers by a sufficient correlation between the contemporary thermogram and the departure station database thermogram are afforded an uninterrupted passage to the departing aircraft. Those passengers in respect of whom the correlation is below the requisite level are directed to a designated area for further identification. This process is carried out for all persons boarding the aircraft.

The departure station may also maintain a database of prohibited persons which preferably is accessed for comparison with all passengers. Any person who is identified as a prohibited passenger maybe prevented from boarding the aircraft.

At the same time or timely during the flight, the packet of information data containing all of the passenger data is transmitted to the destination station where it is stored in the destination station database. Those persons not positively identified in the short period before boarding and allowed to board are investigated further during the relatively long period in which the aircraft is in transit. Accordingly, those passengers for whom authorization is eventually established are provided with easy entry to the destination airport and those who have not been positively identified are detained for further identification.

At the destination airport all passengers proceed past a scanning station where each passenger's identification card is read remotely, thereby enabling the stored thermogram for that card to be retrieved. Each passenger is coincidentally thermogrammed by a remote thermographic scanner focussed on the person carrying the sensed card. The thermograms are compared and where a sufficient correlation is achieved such persons progress to their destination without further interruption by officials through selection gates which may be actuated by the monitoring equipment automatically. Suitably the selection gates unobtrusively capture unauthorized individuals for safe further investigation. The add-on database may be updated at this time automatically to record the arrival of each passenger in the destination country.

Alternatively the departure airport may package the information contained on the identification cards of individuals on a flight and send this to the arrival destination which compiles the packet of identification data for their use to facilitate free passage of bona fide disembarking travelers.

Preferably each station which can access the database has an individual station access code and each operator manning such a station has an individual operator's code. Suitably this information is added to the add-on only file each time an access is made or attempted, Suitably, authorization to access the database is provided in a similar manner wherein biometric correlation is required. Accordingly, an audit trail of actions is maintained and a log of authorized movements of each individual is recorded in such a manner that a history report including details of the operator updating the file can be established.

Foreign travelers in a host country need only carry their identification cards. If queried as to whether they are authorized to be in the particular country, they only need to accompany a government official to a reading station where a contemporary thermogram can be taken and where their identification cards can be used to access the national database to retrieve each individual's thermogram and authorized travelling particulars.

In addition to the foregoing, this invention could be used to monitor individuals entering and exiting a secured area such as border crossings or prisons. Furthermore, the method of providing identification may be utilized to establish the identity of persons undergoing medical treatment. For example, the database may include information in regard to medical condition, blood group or the like and such information may be utilized by hospital staff upon receipt of confirmation of an injured person's identity rather than performing on the spot blood tests to determine that person's blood group. Advantageously, such method will save time. Alternatively, a medical practitioner could prescribe drugs or treatment to a distant patient upon establishment of the patient's identity by the foregoing method secure in the knowledge that the person's identity has been correctly established.

The facilitation of movement of shipping containers or motor vehicles is illustrated schematically in FIG. 5. The term biometric, date as used in relation to the freightable articles means an identifiable attribute specific to the article such as a surface image.

Entities wishing to export on a regular basis will be required to make application to become authorized exporters. On approval of such application all personnel employed by the authorized entity will be issued with a personal identification device as previously described. Information in respect of the preparation, packaging and contents of individual parcels to be shipped in a shipping container will be entered into the add on file in respect of that particular container which will be identified according to the method previously described. Upon closure, the container will be sealed with a seal assembly as previously described which has been issued to the authorized entity by an official issuing authority. Details of the seal may be entered into the database and married with the identification data in respect of the container as an add-on file. If the container is a non-identified container, then the seal details will be married with details of the shipping entity. The same process will be carried out by all authorized exporting entities.

Containers arriving at a shipping station will be remotely scanned to check for any unauthorized access to each container between the dispatching station of the exporting entity and the shipping station and also for any damage to the seal.

Information in respect of all containers to be loaded on a particular ship will be compiled to form a package of data which will be transmitted to the destination port.

At the destination port, the containers will be unloaded and scanned automatically to determine if the seals have been damaged. The seals and the identification data will be compared with the transmitted packet of data. Visual checking to determine whether the containers have been entered by removal of a remote wall panel of the container may also be carried out. A plurality of sealing assemblies may be applied to suitable parts of the container if necessary.

Those containers positively identified (i.e. with a suitable correlation between the transmitted data and the data obtained at the destination) and having the seal intact (that is the seal sends a valid signal), will be directed from the destination port without further checking However, those containers which are either not positively identified or whose seal assemblies do not provide a valid signal will be directed to a checking station for further investigation.

By use of this method, freight forwarded by bona fide exporting entities will be afforded an uninterrupted passage unless an unauthorized party has gained access to the container during shipment or a seal has been accidentally damaged. The method therefore is expected to improve the efficiency of freight movement.

Of course separate parts of the system disclosed herein may be used advantageously where cost or other considerations do not warrant full utilization of the apparatus or method of the invention as described above. However it will of course be realized that the above has been given only by way of illustrative example of the invention and that all such modifications and variations thereto as would be apparent to persons skilled in the art are deemed to fall within the broad scope and ambit of the invention as is herein set forth.

The claims defining the invention are as follows:

1. A method of providing identification of an individual, said method comprising:
   maintaining a database of identification data each including at least one type of non-invasively determinable biometric attribute capable of distinguishing respective individuals, some of the individuals being restricted individuals, to enable identification of an individual by means of the identification data;
   providing each of said identification data with a unique description;
   providing identification means for carriage by each said individual and containing the unique description;
   providing a receiving station in communication with said database, the receiving station determining at least one non-invasively determinable biometric attribute of said individual of a type stored by said database, reading the unique description contained in the identification means carried by said individual, accessing the database to determine the identification data corresponding to the unique description, comparing the attribute determined by the receiving station with the corresponding attribute included in said identification data on said database, and interrupting the progress of the individual if a sufficient correlation between the attribute determined by the receiving station and the attribute on said database is not found;
   wherein said unique description is selected and encrypted so that it cannot yield said identification data by unauthorized processing or de-encryption thereby to render the identification means of no value to a person other than the person to whom the identification means is issued,
   and wherein said identification means further includes validation means arranged to detect tampering with the unique description for outputting a validation signal indicative of whether there has been tampering, and a transponder for transmitting the unique encrypted description and the validation signal,
   and wherein said receiving station is adapted to trigger the transponder to transmit the unique encrypted description and said validation signal, and to flag a failure to verify by said validation means so as to interrupt the progress of the individual.

2. The method of claim 1, wherein said individual is a human.

3. The method of claim 1 wherein said identification means further includes distinguishing means including a built-in time delay for delaying the transmission of the signal, by which a receiving station can distinguish the identification device from other radio frequency responsive devices.

4. The method of claim 3, including access means adapted to provide signal access to the receiving station.

5. The method of claim 4, wherein the access means includes a specific signal stream.

6. The method of claim 3, wherein said identification device further includes an encryption key responsive to said delay wherein encrypted information transmitted from the identification device to a receiving station may be understood only by a receiving station utilizing means suitable for decoding the encrypted information.

7. The method of claim 1, wherein said identification means comprises:
   a) an identification smart card when said individual is a human, and
   b) a smart, tamper evident baggage tag when said individual is a freightable article.

8. The method of claim 7, wherein said card includes a surface having a pattern or ornamentation applied to a face of the card and adapted to be read by an image reader.

9. A method of providing identification of an individual, comprising the steps of:
   a) maintaining a database of identification data each including at least one type of noninvasively determinable biometric attribute capable of distinguishing respective individuals, some of the individuals being restricted individuals, to enable identification of an individual by means of the identification data,
b) providing each of said identification data with a unique description,
c) providing identification means for carriage by each said individual and containing the unique description,
d) providing a receiving station in communication with said database, the receiving station:
   i) determining at least one non-invasively determinable biometric attribute of said individual of a type stored by said database,
   ii) reading the unique description contained in the identification means carried by said individual,
   iii) accessing the database to determine the identification data corresponding to the unique description,
   iv) comparing the attribute determined by the receiving station with the corresponding attribute included in said identification data on said database, and
   v) interrupting the progress of the individual if a sufficient correlation between the attribute determined by the receiving station and the attribute on said database is not found, wherein said unique description is selected and encrypted so that it cannot yield said identification data by unauthorized processing or de-encryption thereby to render the identification means of no value to a person other than to person to whom the identification means is issued, said identification means further including validation means arranged to detect tampering with the unique description for outputting validation data indicative of whether there has been tampering, and said identification means being remotely machine readable by said receiving station allowing the unique encrypted description and the validation data to be retrieved thereby, said receiving station being adapted to flag failure to verify by said validation data so as to interrupt the progress of the individual.

* * * * *